United States Patent [19]
Gregory

[11] 3,841,015
[45] Oct. 15, 1974

[54] FISHING LINE
[75] Inventor: Francis J. Gregory, Tolland, Conn.
[73] Assignee: The Garcia Corporation, Teaneck, N.J.
[22] Filed: June 4, 1973
[21] Appl. No.: 366,430

[52] U.S. Cl. .............................................. 43/44.98
[51] Int. Cl. .......................................... A01k 91/00
[58] Field of Search ............................. 43/44.98, 7

[56] References Cited
UNITED STATES PATENTS
| | | | |
|---|---|---|---|
| 1,927,581 | 9/1933 | Bekeart | 43/44.98 X |
| 2,250,832 | 7/1941 | Hedge | 43/44.98 |
| 2,862,282 | 12/1958 | Beebe | 43/44.98 X |
| 3,334,436 | 8/1967 | Cole, Jr. | 43/44.98 |
| 3,512,294 | 5/1970 | Howald | 43/44.98 |
| 3,653,143 | 4/1972 | Martuch | 43/44.98 |

FOREIGN PATENTS OR APPLICATIONS
| | | | |
|---|---|---|---|
| 1,201,319 | 7/1959 | France | 43/44.98 |

*Primary Examiner*—Louis G. Mancene
*Assistant Examiner*—Daniel J. Leach
*Attorney, Agent, or Firm*—Fitzpatrick, Cella, Harper & Scinto

[57] ABSTRACT

A fly line having a braided tip portion, a braided belly portion, a braided front taper portion interconnecting the tip portion and the belly portion, a braided running line and a braided back taper interconnecting the belly portion and the running line, fabricated from Dacron fibers, Nylon fibers, glass fibers, and combinations thereof, and having a cover of polyvinyl chloride substantially evenly coating the entire line.

16 Claims, 9 Drawing Figures

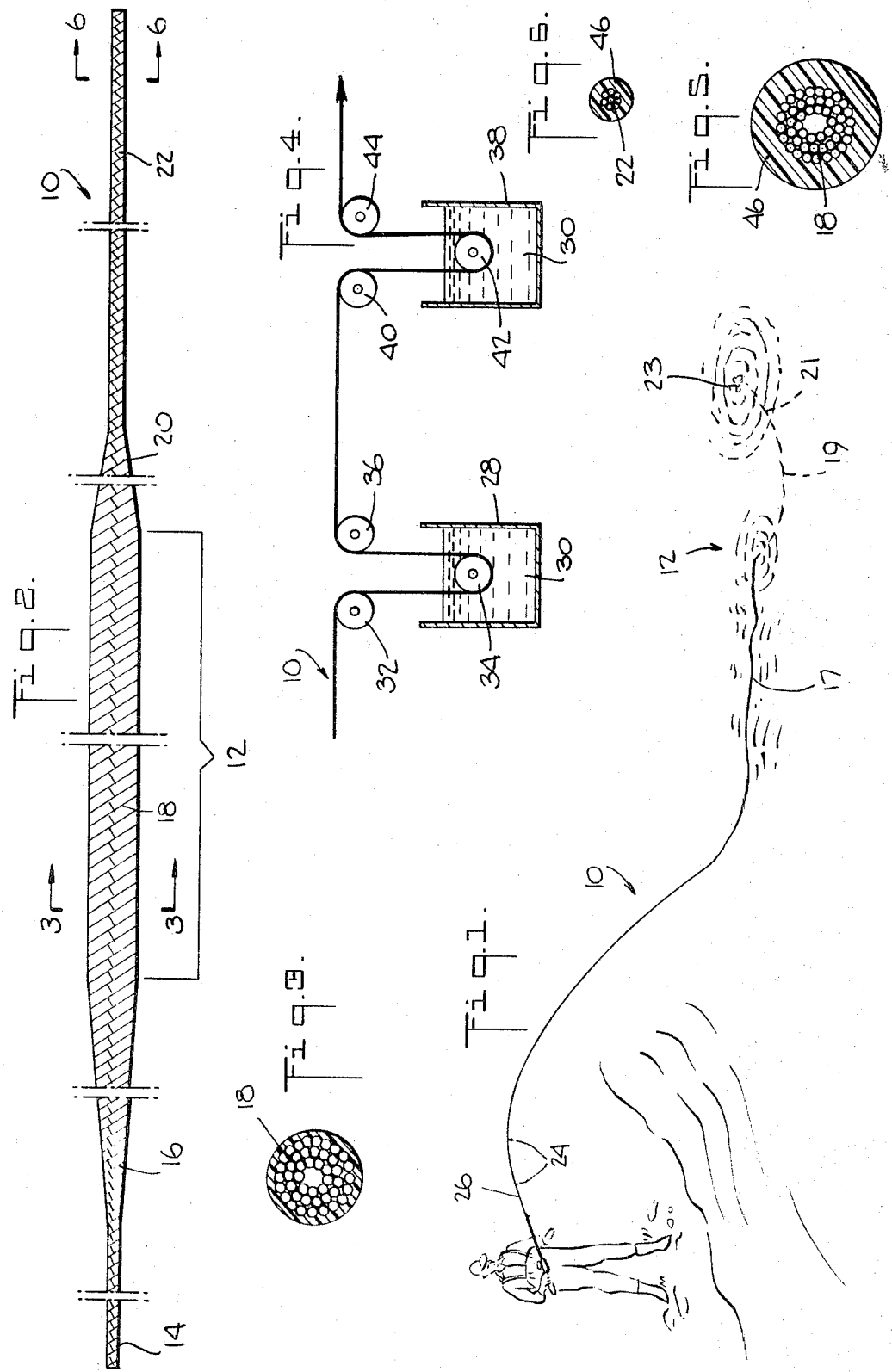

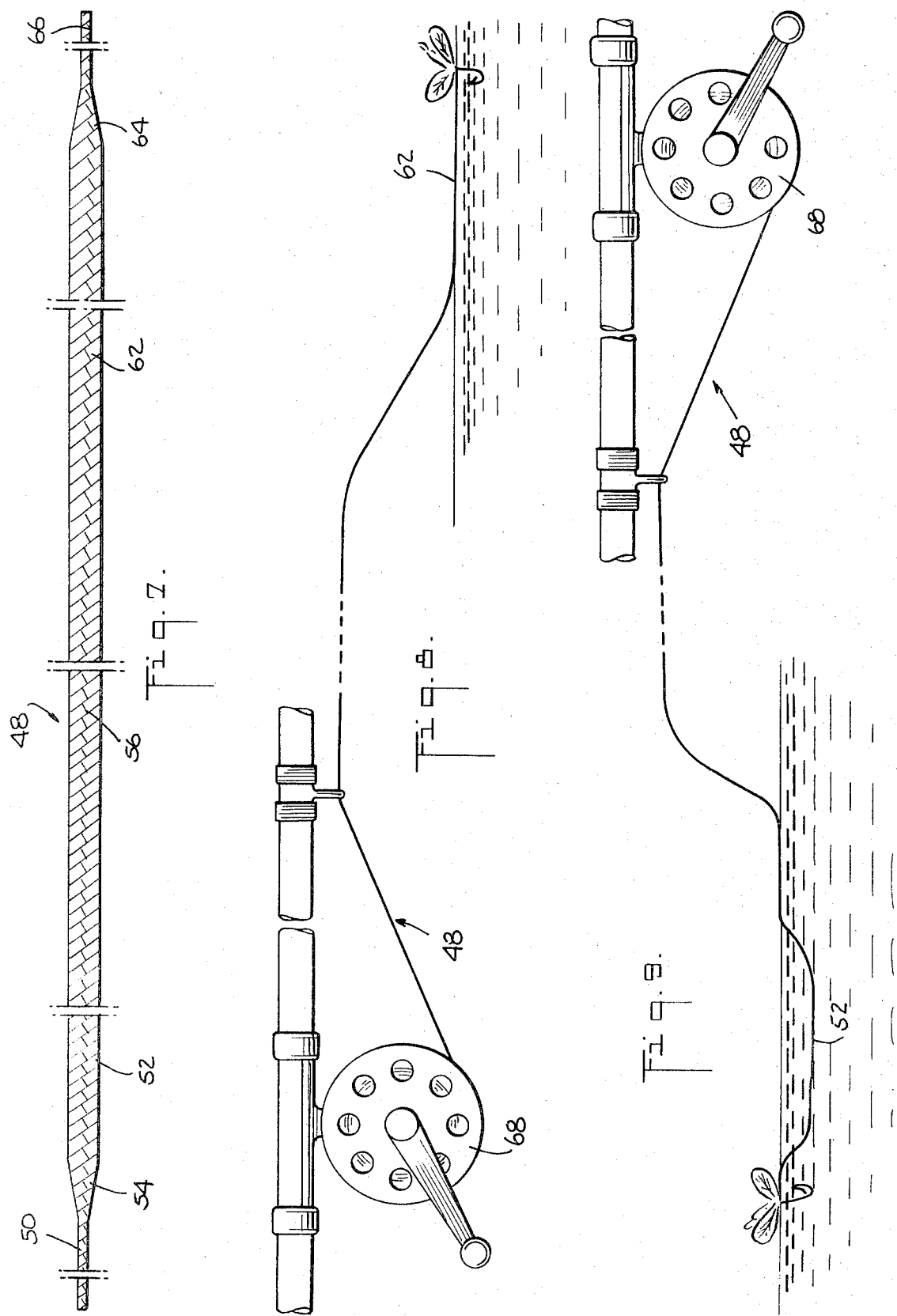

FISHING LINE

This invention relates to fishing lines and more particularly to composite fishing lines and the method of manufacturing such lines. Fishing lines constructed according to the concepts of this invention are particularly adapted, among other possible uses, for use in fly-fishing.

While many different types of fishing lines have been employed with reasonable success heretofore, our contribution to the art is a new construction and method of fabrication, which is an improvement over such known techniques, as will become apparent as the description proceeds. Related patents in the art include U.S. Pat. No. 3,653,143 issued Apr. 4, 1972; U.S. Pat. No. 3,486,266 issued Dec. 30, 1969; U.S. Pat. No. 3,464,140 issued Sept. 2, 1969; U.S. Pat. No. 2,933,798 issued Apr. 26, 1960; U.S. Pat. No. 2,862,282 issued Dec. 2, 1958; U.S. Pat. No. 2,250,832 issued July 29, 1941; U.S. Pat. No. 2,370,112 issued Feb. 20, 1945; U.S. Pat. No. 1,927,581 issued Sept. 19, 1933; and U.S. Pat. No. 1,842,169 issued Jan. 19, 1932.

Thus, the present invention involves a novel combination of features combined in such a way as to provide a fishing line, which is superior to such lines known in the art heretofore.

In order to accomplish the desired results, I provide in one form of my invention, a new and improved fly line characterized by a braided tip portion, a braided front taper portion connected to the tip portion, a braided belly portion connected to the front taper portion, a braided back taper portion connected to the belly portion, and a braided running line connected to the back taper portion. These elements are fabricated from the group consisting of Dacron fibers, Nylon fibers, glass fibers and combinations thereof, and the entire line is covered by a coating of polyvinyl chloride of substantially constant thickness. In one form of the invention, the braided tip portion is of Nylon fibers; the braided belly portion is of glass fibers; the braided front taper portion is of glass and Nylon fibers; the braided running line is of Nylon fibers; and the braided back taper portion is of glass and Nylon fibers. A cover of polyvinyl chloride is substantially evenly disposed over the entire line. In another form thereof, the whole line is fabricated from braided glass fibers, with a polyvinyl chloride coating evenly distributed over the entire line. In addition, according to still another embodiment of the invention, the entire line is fabricated from braided glass fibers except that the belly portion is braided from Dacron fibers, and the entire line is polyvinyl chloride coated.

In still another form of my invention, I provide a double-ended fly line having the belly portion at one end thereof fabricated from glass fibers so that it sinks in the water and having the belly portion at the other end thereof fabricated from Nylon fibers so that it floats on the surface of the water. The fly line can be wound on a fly reel commencing from either end thereof in order to expose the selected end for the particular fishing conditions desired.

According to another aspect of the invention, I provide a method of making a fly line which includes, in combination, the steps of braiding a Nylon tip with Nylon fibers, braiding a front taper portion of glass and Nylon fibers connected to the tip portion, braiding a belly portion of glass fibers connected to the front taper portion, braiding a back taper portion of glass and Nylon fibers connected to the belly portion, and braiding a running line of Nylon fibers connected to the back taper. The entire line is then coated with polyvinyl chloride.

There has thus been outlined rather broadly the more important features of the invention in order that the detailed description thereof that follows can be better understood, and in order that the present contribution to the art will be better appreciated. There are, of course, additional features of the invention that will be described more fully hereinafter. Those skilled in the art will appreciate that the conception on which this disclosure is based may readily be utilized as the basis of the designing of other structures for carrying out the purpose of this invention. It is important, therefore, that this disclosure be regarded as including such equivalent constructions as do not depart from the spirit and scope of the invention.

Several embodiments of the invention have been chosen for purposes of illustration and description, and are shown in the accompanying drawings forming a part of the specification, wherein:

FIG. 1 is a perspective view showing a fishing line constructed according to the concepts of my invention, in actual operation;

FIG. 2 is an enlarged side elevation showing details of the forward head section of the fly line of this invention;

FIG. 3 is an enlarged transverse sectional view of the fly line taken along the line indicated at 3—3 in FIG. 2;

FIG. 4 is a side elevation, partially in section, of an apparatus suitable for carrying out the method of this invention;

FIG. 5 is an enlarged transverse sectional view similar to FIG. 3, but showing the line after a polyvinyl coating has been applied;

FIG. 6 is an enlarged transverse sectional view of the fly line taken along the line indicated at 6—6 in FIG. 2;

FIG. 7 is an enlarged side elevation showing a double-ended fly line constructed according to the concepts of my invention;

FIG. 8 is a side elevation of a fly reel having a fly line extending therefrom, which is characterized by a belly portion fabricated from Nylon fibers; and FIG. 9 shows a side elevation of a fly reel having a fly line extending therefrom which is characterized by a belly portion fabricated from glass fibers.

Referring to the drawings, and initially to FIGS. 2 and 3, there is shown a portion of a fly line indicated generally at 10, having a head section, indicated generally at 12, a tip portion 14 of the order of about 4 feet in length, a front taper portion 16 of the order of about 7 feet in length, a belly portion 18 of the order of about 28 feet in length, a back taper portion 20 of the order of about 2 feet in length, and a running line portion 22 of the order of about 49 feet in length. Thus, the total length of the weight forward sinker is of the order of about 90 feet. For particular conditions, the various dimensions may be varied in order to change the character of the line. It will be particularly appreciated that the entire line is made on a braiding machine. That is, the entire line, including the front taper and the back taper, is fabricated on a braiding machine.

In one form of the invention, the tip and the running line are fabricated from Nylon for long wear. The front and back taper are braided into the line using about half Nylon and half glass fibers, and the belly portion is all glass fibers.

In another form of the invention, the belly is fabricated from Dacron and the tip is fabricated from glass fibers.

In still another form, the belly, front taper and rear taper portions are fabricated from all glass fibers; part of the tip portion is glass and the balance of the tip is Nylon or Dacron.

In another form of the invention, the entire line is fabricated from glass fibers. A woven glass material, by the nature of the material itself, is heavier than water, and therefore, it will sink rapidly. By weaving into the glass line several strands of a lighter material, the speed of sinking can be regulated. Thus, the line can be made to go down slowly or quickly, as desired. Because the weight may be woven into the line in the areas selected, we can make the very point end of the line sink, or the point and the taper, or the entire line, as desired. FIG. 1 illustrates a fly line in action. There is shown a Nylon belly portion 17 laying on the surface of the water and a glass belly portion 19 beneath the surface of the water going to a leader 21 having a fly 23 at the end thereof. In dry fishing, it is preferable to have a fly floating, the leader sinking and the line floating. By being able to pull the leader down with the heavy point of the fly line, we can help to get the leader beneath the surface of the water. When fishing with wet flies and nymphs, it is desirable to get the fly beneath the water quickly, and therefore, the sinking point will accomplish this while the floating fly line will make pick-up and casting easier. By using a very heavy, fast-sinking line, we can get the flies down and "dredge" the bottom. Thus, it will be appreciated that by braiding Nylon fibers into a glass fiber line at selected areas, the desired characteristics may be effected.

The next step in the fabrication of the fly line is to cover the entire line with polyvinyl chloride, or the like material, so that it will slide through the guides 24 on a fly rod 26, FIG. 1. As best seen in FIG. 4, a polyvinyl chloride coating is applied by gravity feed over the entire line. The braided line is fed to a first tank 28 containing the vinyl coating material 30. The line passes over pulleys 32, 34, and 36 and passes up out of the tank. Thence, the line is fed to a second tank 38 also containing the same vinyl coating material 30. The line passes over pulleys 40, 42, 44 and passes up out of the second tank, thereby forming a vinyl cover 46 over the glass and/or Nylon braid 18, as shown in FIG. 5. Thus, the vinyl coating is substantially the same thickness over the entire line. FIG. 6 is a sectional view taken along the line indicated at 6—6 in FIG. 2 showing the line after the polyvinyl coating has been applied illustrating that the taper is in the filaments rather than in the coating.

In still another form of my invention, as best seen in FIG. 7–9, I provide a double-ended fly line, indicated generally at 48, which includes at one end thereof a braided tip portion 50, a braided belly portion of glass fibers 52, a braided front taper portion 54 interconnecting the tip portion and the belly portion, and a braided running line portion 56. At the other end of the running line 56 I provide, a second braided belly portion 62 of Nylon fibers, a second front taper portion 64 connected to the second belly portion and a second tip portion 66 connected to the second front taper portion. There is thus provided a double-ended fly line which may be wound on a fly reel 68 so that the first, or glass fiber belly portion 52 extends from the reel when it is desired to fish with the leader beneath the surface of the water as seen in FIG. 9, and alternatively it may be rewound on the fly reel 68 so that the second Nylon belly portion 62 extends from the reel when it is desired to fish with a leader on the surface of the water, as seen in FIG. 8.

From the foregoing description, it will be seen that the present invention does indeed contribute a new and improved fly line, and a method of fabricating such line, which is superior in flexibility characteristics, weight distribution, and strength, as compared to prior art such lines.

Although particular embodiments of the invention are herein disclosed for purposes of explanation, various modifications thereof, after study of this specification, will be apparent to those skilled in the art to which the invention pertains.

What is claimed and desired to be secured by letters patent is:

1. A fly line usable with a fly rod comprising, in combination, a braided tip portion, a braided belly portion, a braided front taper portion interconnecting said tip portion and said belly portion, a braided running line portion, and a braided back taper portion interconnecting said belly portion and said running line portion, said fly line being fabricated from a member of the group consisting of Nylon, Dacron and glass fibers; and having a cover of polyvinyl chloride forming a coating of substantially constant thickness over the entire line.

2. A fly line according to claim 1 wherein a portion of said belly portion is braided from a combination of glass and Nylon fibers.

3. A fly line usable with a fly rod comprising, in combination, a braided tip portion of a material from the group consisting of Nylon and Dacron fibers, a braided belly portion of glass fibers, a braided front taper portion of glass and a member of the group consisting of Nylon and Dacron fibers interconnecting said tip portion and said belly portion, a braided running line portion of Nylon, and a braided back taper portion of glass and Nylon fibers interconnecting said belly portion and said running line portion.

4. A fly line according to claim 3 wherein said front taper portion and said back taper portion comprise about one-half Nylon fibers and one-half glass fibers.

5. A fly line according to claim 3 further comprising a cover of polyvinyl chloride forming a coating of substantially constant thickness over the entire line.

6. A fly line according to claim 5 wherein said tip portion has a length of about 4 feet, said front taper portion has a length of about 7 feet, said belly portion has a length of about 28 feet, said back taper portion has a length of about 2 feet, and said running line portion has a length of about 49 feet.

7. A fly line usable with a fly rod comprising, in combination, a braided tip portion of glass fibers, a braided belly portion of glass fibers, a braided front taper portion of glass fibers interconnecting said tip portion and said belly portion, a braided running line portion of glass fibers, and a braided back taper portion of glass fibers interconnecting said belly portion and said running line portion.

8. A fly line according to claim 7 further comprising a cover of polyvinyl chloride forming a coating of substantially constant thickness over the entire line.

9. A fly line according to claim 7 wherein said belly portion is also fabricated from Dacron fibers and wherein said line has a cover of polyvinyl chloride forming a coating of substantially constant thickness over the entire length.

10. A fly line usable with a fly rod comprising, in combination, a braided tip portion, part of said tip portion being of braided glass fibers and the remainder of said tip portion being of the group consisting of Nylon and Dacron, a braided belly portion of glass fibers, a braided front taper portion of glass fibers interconnecting said tip portion and said belly portion, a braided running line portion of the group consisting of Nylon and Dacron, and a braided back taper portion of glass fibers interconnecting said belly portion and said running line portion.

11. A double-ended fly line usable with a fly rod comprising, in combination, at one end thereof, a tip portion, a belly portion of glass fibers, a front taper portion interconnecting said tip portion and said belly portion, a running line portion connected to the belly portion, and at the other end of the running line portion, a second belly portion of Nylon fibers connected to a second front taper portion, and a second tip portion connected to the second front taper portion.

12. A double-ended fly line usable with a fly rod comprising, in combination, at one end thereof, a braided tip portion, a braided belly portion of glass fibers, a braided front taper portion interconnecting the tip portion and the belly portion, a braided running line portion connected to the belly portion, a braided running line portion connected to the belly portion, and at the other end of the running line portion, a second braided belly portion of Nylon fibers connected to a second front taper portion, and a second tip portion connected to the second front taper portion, and a cover of polyvinyl chloride forming a coating of substantially constant thickness over the entire line.

13. A method of making a fly line comprising, in combination, the steps of braiding a tip portion of Nylon fibers, braiding a front taper portion of about one-half Nylon and about one-half glass fibers connected to said tip portion, braiding a belly portion of glass fibers connected to said front taper portion, braiding a back taper portion of about one-half glass and about one-half Nylon fibers connected to said belly portion, and braiding a running line portion of Nylon fibers connected to said back taper portion.

14. A method of making a fly line according to claim 13 further comprising the step of applying a uniform coating of polyvinyl chloride by gravity feed over the entire line.

15. A method of making a fly line comprising, in combination, the steps of braiding a tip portion of glass fibers, braiding a front taper portion of glass fibers connected to said tip portion, braiding a belly portion of glass fibers connected to said front taper portion, braiding a back taper portion of glass fibers connected to said belly portion, and braiding a running line portion of glass fibers connected to said back taper portion, and applying a substantially uniform coating of polyvinyl chloride over the entire line.

16. A method of making a fly line according to claim 15 wherein said belly portion is also braided with Dacron fibers.

* * * * *